United States Patent

[11] 3,595,504

| [72] | Inventors | Howard C. Anderson<br>Accord, N.Y. 12404;<br>Gerald L. Barrows, 6926 Sy Road, Niagara Falls, N.Y. 14304 |
|---|---|---|
| [21] | Appl. No. | 790,738 |
| [22] | Filed | Jan. 13, 1969 |
| [45] | Patented | July 27, 1971 |

[54] FISHING ROD HOLDER
5 Claims, 5 Drawing Figs.

[52] U.S. Cl. ................................................ 248/42, 248/289
[51] Int. Cl. ............................................. A01k 97/10
[50] Field of Search ........................................ 248/42, 40, 41, 45, 38, 349, 289, 131, 418, 186

[56] References Cited
UNITED STATES PATENTS

| 1,013,734 | 1/1912 | Boyd | 248/40 |
| 2,289,592 | 7/1942 | Riedi | 248/42 |
| 2,442,357 | 6/1948 | Hamman | 248/42 |
| 2,446,282 | 8/1948 | Hart | 248/42 |
| 2,981,509 | 4/1961 | Messenger et al. | 248/42 |
| 3,006,588 | 10/1961 | Lemi | 248/39 |
| 3,089,674 | 5/1963 | Bastie | 248/40 |
| 3,259,346 | 7/1966 | Rogers | 248/42 |

*Primary Examiner*—Edward C. Allen
*Attorney*—Strauch, Nolan, Neale, Nies & Kurz

ABSTRACT: Fishing rod holders including a base angularly adjustable in a horizontal plane relative to a supporting bracket and a cradle mounted on and vertically adjustable relative to the base.

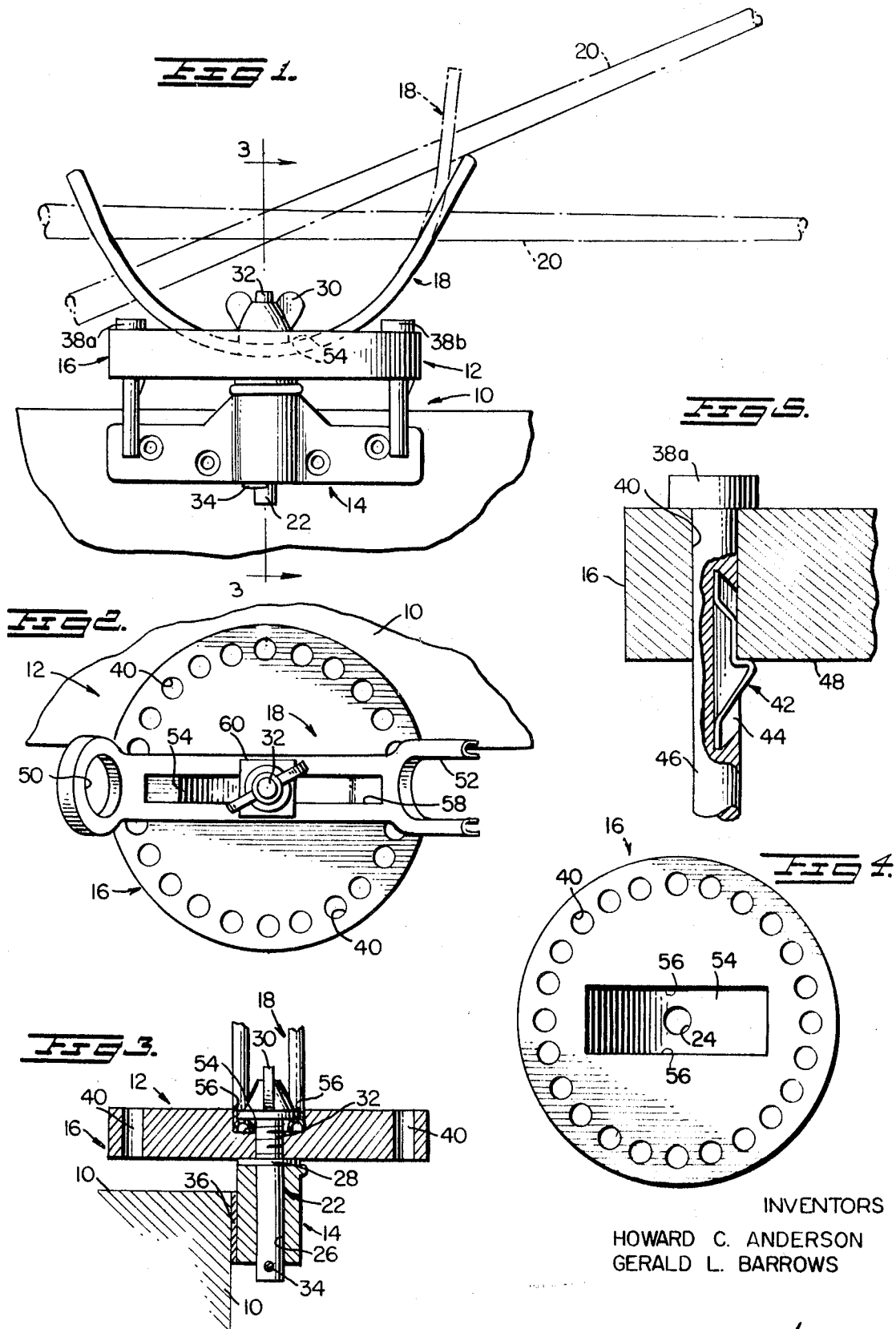
INVENTORS
HOWARD C. ANDERSON
GERALD L. BARROWS

FISHING ROD HOLDER

This invention relates to fishing rod holders of a novel, improved type

Almost without exception the previously proposed fishing rod holders consist of an arcuate cradle and a C-clamp. In these prior art designs the cradle can be rotated and moved vertically relative to the clamp to adjust a fishing rod supported thereby to the desired position. A bolt and a wing nut are employed to retain the cradle in the position to which it is adjusted, and the C-clamp is provided with the usual thumbscrew for securing it to a gunwale or other part of a boat.

One disadvantage of the prior art type of arrangement described above is that it is virtually impossible to securely attach the C-clamp to the boat structure without marring its finish or even damaging the structure if the thumbscrew is overtightened. An at least equally important disadvantage of these prior art holders is that it is not unusual for a fish to pull the C-clamp loose from the structure to which it is fastened. This can result in the loss of a large fish, not to mention the loss of an expensive fishing rig.

Another decided disadvantage of the prior art fishing rod holders described above is that friction alone is relied upon to prevent the cradle from rotating relative to the C-clamp. As a result, it is not rare for a fish to cause the cradle to rotate on the C-clamp. This can cause tangling of lines when more than one rod is out and can also increase the proneness of the C-clamp to come loose from the boat structure to which it is attached.

It is the primary object of the present invention to provide a novel, improved fishing rod holder which does not have the disadvantages of the prior art arrangements described above.

The novel fishing rod holders of the present invention by which the foregoing and other important objects are attained include a base provided with a stem which can be inserted through the aperature in an oarlock or other stationary bracket[2] and secured in place by a pin or other fastener. A series of apertures is formed around the periphery of the base and pins, bolts, or similar members inserted through selected ones of these apertures engage the stationary bracket and prevent the base from rotating relative to it. By inserting the retainers through different ones of the apertures the orientation of the base relative to the stationary bracket and accordingly the angle of the rod disposed in the holder relative to the boat can be varied.

[2] Adhesives with great holding power are currently available as are solvents capable of disolving such adhesives. Accordingly, the brackets in which the holders of the present invention are supported can be attached to virtually any part of a boat and then removed at a later date without damage to the boat if this becomes desirable.

The fishing rod holders we have invented also include a cradle, which may be similar in construction to those employed in the prior art arrangements. In the present invention, however, the cradle is mounted in a groove or channel formed in the base rather than on top of a clamp as in previously proposed holders. Accordingly, the cradle is positively as opposed to frictionally constrained against rotation relative to the base.

One important advantage of the novel arrangement just described is that marring of the finish on the structure to which it is attached as well as the possibility of damaging this structure is eliminated. Also, because of the positive connection employed, the possibility of the holder becoming separated from the boat together with the problems this poses is eliminated. At the same time this type of connection does not result in any sacrifice in versatility as far as adjusting the fishing rod to different positions is concerned.

Another advantage of the present invention results from the restraints which positively prevent the base of the fishing rod holder from rotating relative to the bracket to which it is attached and the cradle from rotating relative to the base. Accordingly, the present invention also eliminates the problems appurtenant to relative rotation between the cradle and the clamp of prior art fishing rod holders. Yet, as in the case of the features discussed above, there is no sacrifice in adjustability of the rod either vertically or horizontally because of these novel innovations.

From the foregoing it will be apparent that further important but more specific objects of the present invention reside in the provision of fishing rod holders:

1. which can be more securely attached to a boat than those heretofore available;
2. which, in conjunction with the preceding object, can be attached to a boat without marring the finish of or otherwise damaging the structure to which it is affixed;
3. which are decidedly superior to prior art holders in their ability to retain a rod supported thereby in the position to which it is adjusted;
4. which include a base attachable to an oarlock or other stationary bracket and rotatively adjustable relative thereto and a cradle which is adjustable to different vertical angles with respect to the base, but is positively held against rotation relative to the base.

Other important objects, further novel features, and additional advantages of the present invention will become apparent from the appended claims and as the ensuing detailed description and discussion proceeds in conjunction with the accompanying drawing in which:

FIG. 1 is a side view of a fishing rod holder constructed in accord with and embodying the principles of the present invention and a fragment of a boat to which the holder is attached;

FIG. 2 is a plan view of the fishing rod holder of FIG. 1;

FIG. 3 is a section through the holder of FIG. 1, taken substantially along lines 3–3 of FIG. 1;

FIG. 4 is a plan view of the base of the holder of FIG. 1; and

FIG. 5 is a section through the base of the holder of FIG. 1 showing the type of member by which the holder base can be retained in the position to which it is adjusted.

Referring now to the drawing, FIG. 1 depicts a boat 10 (shown in fragmentary form) equipped with a fishing rod holder 12 constructed in accord with the principles of the present invention and attached to the boat by a bracket 14. The major components of holder 12 are a base 16 and a cradle 18 mounted on the base in which the fishing rod (shown diagrammatically in FIG. 1 and identified by reference 20) is supported. Base 16 may be rotatably adjusted relative to bracket 14, thereby varying the angle at which fishing rod 20 extends from boat 10. Cradle 18 may be adjusted radially relative to base 16 to vary the vertical inclination of rod 20 as shown in FIG. 1.

The base 16 of fishing rod holder 12 (see FIGS. 1—4) is a disclike member, which may be fabricated from either a corrosion-resistant metal or a high strength plastic. Base 16 is secured to supporting bracket 14 by an elongated member or stem 22 which extends through a central aperture 24 in the base and a vertical aperture 26 through the bracket. A nut or similar member 28 brazed or otherwise fixed to stem 22 intermediate its upper and lower ends prevents the stem from dropping through aperture 26 and also supports base 16.

Base 16 is retained on nut 28 by a wingnut 30 or other retainer threaded on the upper or free end of a threaded extension 32 of stem 22. As will be apparent from FIG. 3, this arrangement permits base 16 to be rotated relative to stationary bracket 14 and boat 10.

Stem 22 is retained in bracket 14 by a standard snap pin 34 which extends through stem 22 at the lower end thereof (i.e., on the opposite side of bracket 14 from base 16) and engages the bracket to retain the stem and base 16 in place. This prevents fishing rod holder 12 from being pulled loose from the boat with an attendant loss of a fish or fishing rig or both. Different types of fasteners (such as a cotter key) may be substituted for snap pin 34, but it is preferred that the one selected be easily removable to permit ready detachment of fishing rod holder 12 from bracket 14, when desired.

The bracket 14 to which the base 16 of the fishing rod holder is attached may be of any desired configuration. It is shown in FIG. 1 as a conventional oarlock for the sake of convenience and because oarlocks of the illustrated type are satisfactory, inexpensive, and readily available as well as being already present on many boats. Thus, the novel fishing rod holders disclosed herein may be attached to the existing oarlocks of boats so equipped. For boats not equipped with oarlocks or where additional or different holder locations or installations are desired, brackets 14, whether oarlocks or otherwise, may be readily attached by screws, rivets, or the like. Alternatively, the brackets may be attached by one of the several high strength, pressure sensitive adhesives which are currently available.[3] If attached in this fashion the brackets may be readily removed by using a solvent such as hydrogen peroxide to soften the adhesive.[4] The advantage of using an adhesive to attach the brackets is that there are no holes when the brackets are removed or relocated.

[3] Such an adhesive is shown at 36 in Figure 3.
[4] Adhesively mounted brackets can also be relocated and reused as the typical adhesive will not lose its bonding strength if softened with a solvent and then permitted to reharden.

Turning now to FIGS. 1 and 5, base 16 is rotatably mounted relative to stationary bracket 14 and boat 10 by stem 22 as discussed above, permitting fishing rod 20 to be adjusted at different angles relative to boat 10. To maintain the base, cradle, and rod in the position to which the latter is adjusted, elongated, headed members or pins 38a and 38b are employed in conjunction with apertures 40 formed in base 16 around the periphery thereof at generally uniformly spaced intervals. As shown in FIG. 1, members 38a and 38b are sufficiently long to engage the bracket 14 in which base 16 is supported. Accordingly, with these members inserted through diametrically opposed apertures 40, base 16 is constrained against rotation relative to bracket 14. By removing pins 38a and 38b, rotating base 16 relative to bracket 14, and inserting members 38a and 38b through the apertures 40 then closest to bracket 14, rod 20 may be maintained in a new, adjusted angle relative to boat 10.

Any desired type of headed member 38 may be employed in the practice of the present invention. Preferred, however, is the type shown in FIG. 5 which includes a spring detent 42 secured in a slot 44 in the shank 46 of the member. Such members are easily insertable, positively retained in place by the engagement of the detent with the lower surface 48 of base 16, and quickly removed by depression of the detent.

Fasteners 38 of the type just described are widely available commercial items. For this reason and because their details are not critical in the practice of the present invention, they will not be described further herein.

Referring now to FIGS. 1—3, the cradle 18 employed in fishing rod holder 12 is also of conventional construction and will accordingly not be described in great detail herein. Briefly, however, cradle 18 is an elongated member, preferably formed of sheet metal, and having an arcuate profile as best shown in FIG. 1 and a ribbed construction to increase its strength. Cradle 18 has an aperture 50 in one end and a U-shaped slot 52 at the other. The butt end of the rod 20 is inserted through aperture 50, and a more forward portion of the rod rests in slot 52.

As shown in FIGS. 1 and 2, cradle 18 is seated in an elongated groove or channel 54 in base 16. This channel is of generally the same width as the cradle and has generally the same arcuate profile (see also FIG. 4). This is a novel and important innovation in that the abutments 56 provided by the sidewalls of channel 54 (see FIG.0) positively prevent cradle 18 from rotating relative to base 16, eliminating the problems appurtenant to such rotation discussed above.

The inclination of the rod 20 supported in cradle 18 is varied by moving the cradle radially in channel 54 as shown in FIG. 1 with such movement varying the relative vertical disposition of rod supporting aperture 50 and U-shaped slot 52. When the desired inclination is reached, cradle 18 is maintained in the adjusted position by tightening the wingnut on stem extension 32, which extends upwardly through a longitudinally elongated slot 58 in the cradle and washer 60.

Many modifications may of course made in the exemplary embodiment of the present invention described above. For example, as suggested previously, brackets 14 may have many different configurations. And, as also mentioned, other devices may be substituted for the illustrated members 38. In addition, different forms of cradles such as those shown, for example, in U.S. Pats. Nos. 3,058,251 to Brooks and 3,154,274 to Hillcourt and the other patents identified above may be substituted for the cradle illustrated in the drawing. Other modifications of a similar nature will readily occur to those skilled in the arts to which the present invention pertains. Accordingly, to the extent that such modifications of the illustrated embodiment are not expressly excluded from the appended claims, they are fully intended to be covered therein.

Further, it will be obvious that fishing rod holders of the type described herein can be attached to structures other than boats such as docks, pilings, etc. Accordingly, the references to boats hereinbefore are intended to be merely illustrative of the applications of the invention and not as limitations upon its scope.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to be secured by Letters Patent is:

1. The combination of a fishing rod holder and a supporting bracket therefor, said holder comprising a base; means for so attaching said base to said bracket that said base is rotatably adjustable relative to the bracket; a rod supporting cradle mounted on said base and adjustable to different vertical angles relative to said base; means for maintaining said cradle at the vertical angles to which it is adjusted; and means for maintaining said base in the positions to which it is rotated relative to the supporting bracket, the base of the fishing rod holder having a series of apertures therethrough around its periphery and the means for maintaining the base in the position to which it is rotated relative to the supporting bracket comprising elongated members insertable through diametrically opposed ones of said apertures and external surface portions on said supporting bracket engageable by said elongated members to prevent rotation of the base relative to the bracket, said elongated members being removable from said base to permit rotation of the base relative to the supporting bracket.

2. The combination of claim 1, wherein said supporting bracket has an aperture therethrough and the means for attaching said base to said bracket comprises a stem connectable to said base and extending through said aperture and fastener means carried by said stem and engageable with said bracket on the side thereof opposite said base to retain said stem in said bracket, said fastener means being removable from said stem to permit removal of said base from said bracket.

3. The combination of claim 2, wherein said base has a central aperture therethrough, said cradle has a longitudinally extending slot therein, and the means for maintaining the cradle in the position to which it adjusted relative to the base comprises a threaded extension on said stem which extends through the central aperture in said base and the slot in said cradle and a retainer threaded on the free end of said extension for clamping said cradle against said base.

4. The combination of claim 1, wherein said bracket has a flat surface portion with an adhesive thereon for attaching said bracket to a boat or other supporting structure.

5. The combination of claim 1, wherein said cradle has an arcuate profile and rod-engaging means at the opposite ends thereof, whereby the relative vertical disposition of said rod-engaging means and accordingly the inclination of a rod engaged thereby can be varied by radial movement of said cradle relative to said base, and wherein said base has a channel therein having generally the same arcuate profile and width as said cradle, said cradle being seated in said channel and thereby restrained against rotation relative to the base by the sides of said channel.

UNITED STATES PATENT OFFICE
CERTIFICATE OF CORRECTION

Patent No. 3,595,504      Dated July 27, 1971

Inventor(s) Howard C. Anderson and Gerald L. Barrows

It is certified that error appears in the above-identified patent and that said Letters Patent are hereby corrected as shown below:

Column 1, the first paragraph should read as follows:
--This invention relates to fishing rod holders and, more particularly, to fishing rod holders of a novel, improved type.--.

Column 1, line 36, change "aperature" to --aperture--.

Column 3, line 61, change "FIG.0" to --FIG. 3--.

, line 72, insert --be-- after "course".

Signed and sealed this 21st day of March 1972.

(SEAL)
Attest:

EDWARD M. FLETCHER, JR.      ROBERT GOTTSCHALK
Attesting Officer            Commissioner of Patents